United States Patent [19]
Ceplon

[11] 3,782,452
[45] Jan. 1, 1974

[54] SPACER SYSTEM FOR USE WITH PIPES EMPLOYING TRACER LINES

[76] Inventor: Peter Sol Ceplon, 267 S. Main St., Mansfield, Mass. 02048

[22] Filed: May 5, 1972

[21] Appl. No.: 250,698

[52] U.S. Cl. ................ 165/135, 138/111, 138/112, 138/148, 165/164, 165/185, 219/301, 219/535
[51] Int. Cl. ............................................ F28f 13/00
[58] Field of Search .................. 165/164, 172, 185, 165/136, 135; 138/111, 112, 113, 114, 148; 219/301, 535

[56] References Cited
UNITED STATES PATENTS

| | | | |
|---|---|---|---|
| 1,988,642 | 1/1935 | Wolbers | 165/154 X |
| 3,366,170 | 1/1968 | Welz | 165/53 |
| 3,512,581 | 5/1970 | Lawton | 165/164 X |
| 1,419,171 | 6/1922 | Read | 138/148 X |
| 2,773,513 | 12/1956 | Isenberg | 165/164 X |
| 3,088,495 | 5/1963 | Svec | 138/114 X |
| 3,548,158 | 12/1970 | McCaskill | 138/112 X |

FOREIGN PATENTS OR APPLICATIONS

| | | | |
|---|---|---|---|
| 1,081,889 | 9/1967 | Great Britain | 138/112 |

*Primary Examiner*—Albert W. Davis, Jr.
*Assistant Examiner*—S. J. Richter
*Attorney*—Norman E. Brunell

[57] ABSTRACT

A spacer system, including a removeable metal spacer and a standoff; for use with pipelines employing tracer lines for heat transfer. The spacer system serves to support an outside casing of insulation at a distance from the inner pipe to create an air space and also serves to improve the heat transfer between the tracer line and the pipe.

7 Claims, 4 Drawing Figures

SPACER SYSTEM FOR USE WITH PIPES EMPLOYING TRACER LINES

BACKGROUND OF THE INVENTION

1. Field of the Invention

This invention relates to spacers used to support insulation on pipes. In particular, this invention relates to configurations of such spacers used with pipelines that employ tracer lines.

In many pipeline installations, especially those used out-of-doors, it is necessary to prevent the fluid in the pipe from congealing because of low temperature or low rates of flow. This is normally accomplished by providing tracer lines. These tracer lines are additional pipes, usually of a much smaller diameter, run in parallel with the main pipe. These tracer lines carry steam or other heated fluid so that, by conduction, the fluid in the main or inner pipe may be kept at a constant temperature. It is also possible in certain other installations to require the tracer lines to carry a cooling fluid.

In order to prevent the heat of the steam tracer from being radiated away from the pipe, it is standard practice to surround the pipe and tracer line combination with an insulating covering or casing such as fiberglass. Such installations leave an air space between the casing and the inner pipe to serve as additional insulation.

2. Description of the Prior Art

Although various configurations of spacers have been previously designed, it is common practice in actual installations, because of the cost and labor involved, to utilize blocks of the fiberglass insulation cut from the casing and strapped around the inner pipe with bailing wire to support the casing away from the pipe thereby creating the air space.

Then the casing is installed. The casing is usually in the form of three-foot segments of hollow cylinder that are slotted along one side to form two sections so that the sections may be spread apart and the casing segment slipped over the pipe line. Each segment must be secured by strapping or banding to prevent the sections from separating. Then the segments must be secured together to form a continuous casing. When applied in this manner, the casing cannot be removed.

In addition to the cost and labor involved with such installations, it is necessary to provide a separate means for securing the tracer line against the inner pipe. Steel banding is usually used.

Another major problem with such installations is the inefficiency of the heat transfer between the tracer line and the inner pipe. Conduction occurs only at the single point of tangential contact between the pipes. The trapped air space serves to collect some of the heat from the tracer line and transfer it to the inner pipe through radiation. This is an inefficient process.

SUMMARY OF THE INVENTION

The instant invention avoids the difficulties enumerated above by providing a new and improved spacer system of the following type. The first and major element of the system, for use with straight runs of pipe, is a metal spacer that snaps onto the tracer line and encircles the inner pipe. The spacer provides the necessary support for the insulation or casing away from the inner pipe to create an air space between the inner pipe and the casing. Heat transfer between the tracer and the inner pipe is greatly improved by the metal spacer because of the additional heat conduction path the spacer provides between the tracer line and the inner pipe. The material from which the spacer is made may be chosen for sufficient strength so that the spacer alone may be utilized to secure the tracer line to the inner pipe. The spacer is formed from a single continuous sheet of metal. Fastener means to hold the edges of the spacer together around the inner pipe are provided so that the spacer may be applied to an existing pipe line installation with minimum difficulty. The fastening means is in the form of a gripper that also serves to support the casing. Further, the pressure of the casing against the gripper portion of the spacer serves to strengthen the grip rather than weaken it. Cleats are provided to keep the halves of the casing together and also to aid in securing the segments of the casing together to form a continuous casing. The cleats are bent to hold the casing and may easily be bent to remove it.

An alternate embodiment of the spacer just described is shown that provides the above-described advantages and is also conveniently useable for more than one size of pipe. This embodiment is fabricated from two pieces of metal, the smaller or size piece is of simple construction and is replaceable with a different size piece to modify the spacer for use with other sizes of inner pipe without requiring a change in the main piece. The other element in the system is a standoff. The standoff is required to preserve the integrity of the air space around corners and curves in the pipeline. The standoff is also required when the tracer line is spiralled around the inner pipe at elbows, valve fittings, etc. The standoff can be snapped onto the tracer line at any point including along a bend in the tracer line or can be attached directly to the inner pipe with glue or other means and used to support the casing at the proper distance.

DESCRIPTION OF THE PREFERRED EMBODIMENTS

Figure 1:
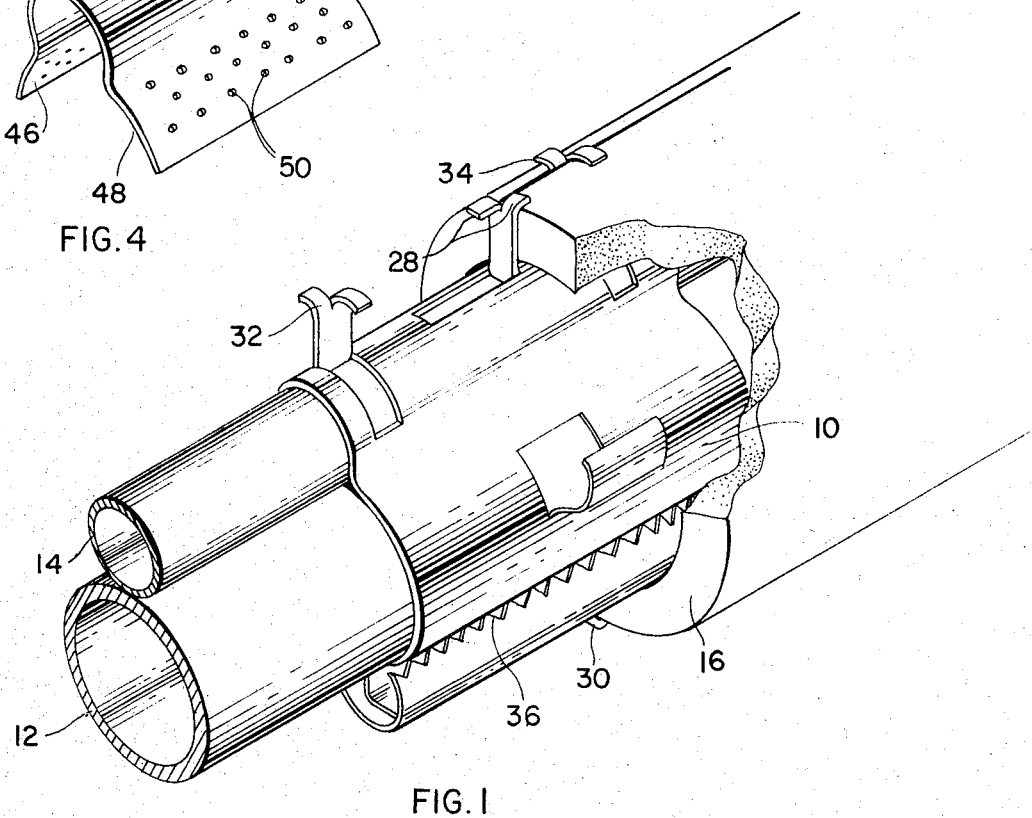
FIG. 1 is a perspective view of the spacer of the invention mounted on a pipeline employing a single tracer line.
Figure 2:
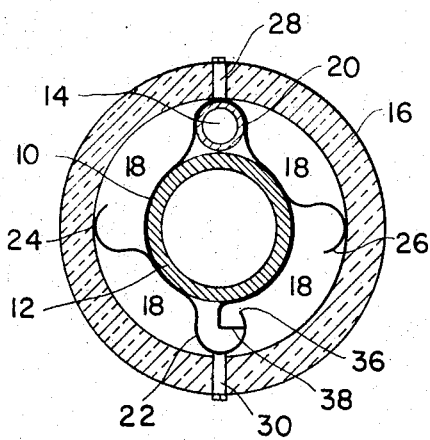
FIG. 2 is an end view of the installation shown in FIG. 1.

Referring now to the drawings, FIGS. 1 and 2 show spacer 10 installed on a pipeline employing a single tracerline 14 and inner pipe 12. Outside casing 16, which may conveniently be made of an insulating material such as fiberglass, is supported by spacer 10 away from inner pipe 12 at a distance equal to the diameter of tracer line 14 thereby creating air passages 18 coaxial with and surrounding inner pipe 12.

Casing 16 rests upon channel 20 which is formed around tracer line 14, gripper 22, and additional supports 24 and 26. Supports 24 and 26 are tabs formed from the body of spacer 10 at appropriate places. Channel 20 and gripper 22 are each provided with cleats 28 and 30 respectively which are tabs that extend radially outward from the surfaces that support the inner surface of casing 16. The ends of these tabs may be bent to secure the separate segments of casing 16 together to form a continuous casing along the pipeline.

Channel 20 is provided with additional cleats 32 and 34 that are oriented perpendicularly to cleat 28. These cleats are tabs that may be bent to secure the split sections of a single segment of casing to form a cylinder to surround the pipeline. Channel 20 snaps onto tracer line 14 to surround and secure it.

Spacer 10 may be formed from a single sheet of metal. Gripper 22 is a channel of the same size as channel 20 and is formed at one end of the sheet of metal. At the edge of gripper 22 are formed teeth 36. Gripper 22 clasps edge 38 of spacer 10 to form the spacer into a cylinder. Edge 38 is bent at right angles to the end of spacer 10 to allow for the expansion or contraction of inner pipe 12. As the inner pipe 12 changes dimensions, gripper 22 and edge 38 will bend but will not move in relation to casing 16 and therefore will not wear or otherwise damage casing 16. Teeth 36 are compressed by casing 16 against spacer 10 to further secure the assembly and strengthen the action of gripper 22.

Figure 3:
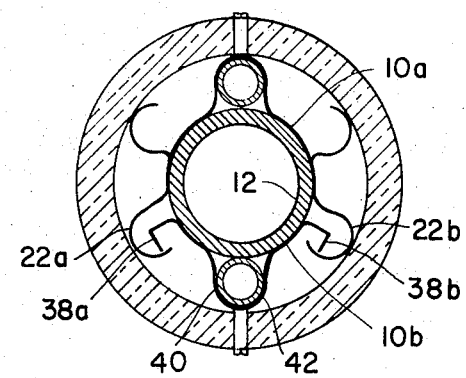
FIG. 3 is an end view of an alternate embodiment of the invention mounted on a pipeline employing two tracer lines.

Referring now to FIG. 3, an alternate embodiment of the invention is shown for use with pipelines employing two tracer lines. This embodiment may be distinguished from the previous embodiment by the addition of channel 40 which surrounds additional tracer line 42. Spacer 10 is formed from two pieces of metal in this embodiment, main piece 10a and size piece 10b, containing individual channels 20 and 40 respectively. Main piece 10a is formed with two grippers, 22a and 22b that correspond to the two edges 38a and 38b of size piece 10b.

Different sizes of inner pipe 12 may be accomodated by using the same main piece 10a and changing only size piece 10b. The functions of the elements of this embodiment are the same as those described hereinabove with reference to FIGS. 1 and 2.

Figure 4:
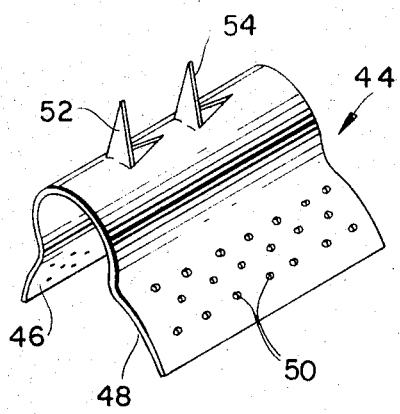
FIG. 4 is a perspective view of the standoff.

FIG. 4 is a perspective view of standoff 44. The standoff is a channel of approximately the same dimensions as channel 20 described hereinabove. Standoff 44 may be snapped onto tracer line 14 or may be secured to inner pipe 12 by legs 46 and 48. These legs are slightly curved in order to better fit flatly against the outside surface of the inner pipe. These legs include holes 50 so that standoff 44 may be secured to pipe 12 with epoxy or glue. The holes serve to allow the glue to flow through the legs and form "nailheads" of glue to strengthen the bond between the standoff and pipe.

Standoff 44 may be conveniently utilized at any point along pipe 12 requiring support for casing 16 that is not supplied by spacer 10. The support may be required around elbows or wherever the tracer and inner pipe are not parallel runs of straight pipe. Around elbows for example, it is conventional to utilize mitred sections of casing fitted together to follow the contour of the inner pipe. Points 52 and 54 are provided to secure the mitred pieces together to form the required continuous casing by having the points imbedded into pieces of casing.

The total length of the channel shaped portion of standoff 44 may be conveniently made smaller than the corresponding dimension of channel 20 in spacer 10. This will allow the standoff to be secured in places where the pipe is bent at a relatively sharp angle, such as at an elbow.

Although preferred embodiments of the invention have been described, it should be noted that various alterations, additions and deletions may be made without departing from the spirit or scope of the invention. In particular, it would be a trivial matter to further rearrange the elements shown in the drawings to accomodate other configurations of pipe and tracer line. It is well within the ordinary skill in this art to add ribbing, additional pieces of metal, etc. to enhance the strength, security or heat conduction displayed in the embodiments herein described.

I claim:

1. An improved spacer system for use with pipelines having
an inner pipe for fluid flow, a tracer line positioned parallel thereto for flow of fluid used for heat transfer, and an outer casing of insulating material coaxial with the inner pipe and secured at a constant distance therefrom, wherein the improvement comprises:
snap-on means for encircling the major portion of the circumference of the tracer line not in contact with the inner pipe to conduct heat therefrom;
heat conduction means connected to the snap-on means for encircling the major portion of the circumference of the inner pipe not in contact with the trace line to conduct heat thereto; and
support means to provide support for the outer casing at a constant distance from the inner pipe roughly equal to the diameter of the tracer line;
whereby the casing is supported at a fixed distance from the inner pipe by the combination of the support means and the snap-on means,
whereby the tracer line is firmly secured in parallel relationship with the inner pipe, and
whereby heat transfer between the tracer line and inner pipe is improved.

2. The improved spacer for use with pipelines as claimed in claim 1 wherein the heat conduction means further comprises:
edge structure extending radially outward from and running parallel to the axis of the inner pipe, and
means for gripping the edge structure to secure the spacer to the pipeline, said gripping means having a compression portion at the point of contact with the edge structure, said gripping means further having a radial outward extension from the inner pipe approximately equal to the diameter of the tracer line,
whereby the outermost part of the gripping means may serve as an additional support for the outer casing,
whereby the pressure exerted on the gripping means by the outer casing forces the compression portion of the gripping means against the edge structure,
whereby the spacer may be firmly secured to a previously installed section of an inner pipe and tracer line combination to form a completed hollow cylinder surrounding the combination with minimum of time and effort, and
whereby the spacer may be reusably removed therefrom.

3. The improved spacer for use with pipelines as claimed in claim 1 wherein the heat conduction means further comprises:

a first piece in the form of a section of a hollow cylinder for encircling more than one half of the circumference of the inner pipe, and a second piece in the form of the remaining section of a hollow cylinder for encircling the remaining circumference of the inner pipe, whereby the spacer may be utilized for a plurality of inner pipe diameters by utilizing one size of first piece and changing only the size of the second piece.

4. The improved spacer for use with pipelines as claimed in claim 1 wherein the improvement further comrpises:

cleat means extending radially outward from the snap-on means for securing the outer casing against the snap-on means.

5. The improved spacer for use with pipelines as claimed in claim 2 wherein the end of the edge structure is bent at right angles to the radial extension whereby the spacer may allow for expansion of the inner pipe.

6. The improved spacer for use with pipelines as claimed in claim 2 wherein the compression portion of the gripping means is in the form of teeth.

7. The improved spacer as claimed in claim 1 wherein the improvement further comprises:

separate standoff means to provide support for the outer casing at a constant distance from the inner pipe roughly equal to the diameter of the tracer line, whereby the casing may be continued around bends in the inner pipe.

* * * * *